United States Patent
Brekke et al.

(10) Patent No.: US 10,048,686 B2
(45) Date of Patent: Aug. 14, 2018

(54) METHODS AND APPARATUS TO AUTONOMOUSLY NAVIGATE A VEHICLE BY SELECTING SENSORS FROM WHICH TO OBTAIN MEASUREMENTS FOR NAVIGATION

(71) Applicant: The Boeing Company, Chicago, IL (US)

(72) Inventors: Darin William Brekke, Fox Island, WA (US); Robert Stewart McBride, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/935,110

(22) Filed: Nov. 6, 2015

(65) Prior Publication Data
US 2017/0131716 A1    May 11, 2017

(51) Int. Cl.
G05D 1/00     (2006.01)
G05D 1/02     (2006.01)
(Continued)

(52) U.S. Cl.
CPC ........... *G05D 1/0088* (2013.01); *G01C 21/20* (2013.01); *G05D 1/021* (2013.01); *G01C 21/3415* (2013.01)

(58) Field of Classification Search
CPC .............. G05D 1/027; G05D 1/0278; G05D 2201/0201; G05D 1/0274; G01C 21/165;
(Continued)

(56) References Cited

U.S. PATENT DOCUMENTS 6,278,939 B1 *   8/2001   Robare ............. G01C 21/3461
                                                            342/357.52
6,292,745 B1 *   9/2001   Robare ............. G06F 17/30241
                                                               340/988
(Continued)

OTHER PUBLICATIONS

Khosla, et al. "Distributed Sensor Resource Management and Planning." Proc. of SPIE vol. 6567 (2007). 16 pages.
(Continued)

*Primary Examiner* — Anne M Antonucci
*Assistant Examiner* — Sanjeev Malhotra
(74) *Attorney, Agent, or Firm* — Hanley, Flight and Zimmerman, LLC

(57) ABSTRACT

Methods and apparatus to autonomously navigate a vehicle by selecting sensors from which to obtain measurements for navigation are disclosed. An example method to navigate a vehicle includes determining environmental data associated with an area in which the vehicle is to navigate; based on the environmental data, automatically ranking a plurality of sensors that are available to the vehicle by respective costs of using the sensors to generate a navigation solution; automatically determining a subset of the sensors from which to obtain measurements based on the ranking and based on comparisons of a) first importance values of the sensors for navigating the vehicle with b) second importance values of the sensors for performing a non-navigation task; obtaining measurements from the subset of the sensors; calculating a navigation command to navigate the vehicle; and executing a first navigation action to implement the navigation command.

23 Claims, 6 Drawing Sheets

(51) Int. Cl.
*G01C 21/20* (2006.01)
*G01C 21/34* (2006.01)

(58) Field of Classification Search
CPC .... G01C 21/16; G01C 21/005; G01C 25/005; G01C 21/3461; G01S 19/14; G01S 19/53; A01B 69/004; A01B 60/007; A01B 69/008; A01B 79/005; G06F 3/0346
USPC ........ 701/1, 23, 25, 26, 31.4, 400, 408, 445, 701/470, 472, 480, 501, 505, 533, 500; 342/357.52, 357.59; 340/988; 345/629; 73/9; 702/141, 25; 1/1
See application file for complete search history.

(56) References Cited

U.S. PATENT DOCUMENTS

| | | | | |
|---|---|---|---|---|
| 7,272,474 | B1* | 9/2007 | Stentz | G01C 7/04 |
| | | | | 701/26 |
| 8,457,891 | B1* | 6/2013 | Vallot | G01C 21/165 |
| | | | | 701/501 |
| 9,462,319 | B2* | 10/2016 | Bai | H04N 21/41422 |
| 2005/0234644 | A1* | 10/2005 | Lin | G01C 21/165 |
| | | | | 701/470 |
| 2007/0143018 | A1* | 6/2007 | Murlidar | G01C 21/3688 |
| | | | | 701/500 |
| 2009/0070034 | A1* | 3/2009 | Oesterling | G01C 21/3629 |
| | | | | 701/533 |
| 2011/0054729 | A1* | 3/2011 | Whitehead | A01B 69/007 |
| | | | | 701/31.4 |
| 2011/0090116 | A1* | 4/2011 | Hatch | G01S 19/40 |
| | | | | 342/357.59 |
| 2011/0288772 | A1* | 11/2011 | Tanino | G01C 21/165 |
| | | | | 701/472 |
| 2012/0022784 | A1* | 1/2012 | Louis | G01C 21/005 |
| | | | | 701/445 |
| 2012/0086725 | A1* | 4/2012 | Joseph | G06F 3/038 |
| | | | | 345/629 |
| 2012/0245839 | A1* | 9/2012 | Syed | G01C 21/165 |
| | | | | 701/408 |
| 2013/0006528 | A1* | 1/2013 | Napolitano | G01C 21/165 |
| | | | | 701/505 |
| 2013/0138264 | A1* | 5/2013 | Hoshizaki | G01C 21/165 |
| | | | | 701/1 |
| 2015/0160024 | A1* | 6/2015 | Fowe | G01C 21/3461 |
| | | | | 701/400 |
| 2015/0160655 | A1* | 6/2015 | Korthals | A01B 69/004 |
| | | | | 701/23 |
| 2015/0268047 | A1* | 9/2015 | Morin | G01S 19/252 |
| | | | | 701/480 |
| 2015/0344037 | A1* | 12/2015 | Siegel | B60W 50/0097 |
| | | | | 73/9 |
| 2015/0354951 | A1* | 12/2015 | Ali | G01C 21/16 |
| | | | | 702/141 |
| 2016/0011597 | A1* | 1/2016 | Webber | E02F 9/2045 |
| | | | | 701/25 |
| 2016/0205864 | A1* | 7/2016 | Gattis | A01M 7/0057 |
| 2016/0305779 | A1* | 10/2016 | Keyzer | G01C 17/38 |

OTHER PUBLICATIONS

Wikipedia.org. "Kalman filter." retrieved from <https://en.wikipedia.org/wiki/Kalman_filter> on Nov. 6, 2015. 32 pages.

* cited by examiner

METHODS AND APPARATUS TO AUTONOMOUSLY NAVIGATE A VEHICLE BY SELECTING SENSORS FROM WHICH TO OBTAIN MEASUREMENTS FOR NAVIGATION

FIELD OF THE DISCLOSURE

This disclosure relates generally to autonomous navigation and, more particularly, to methods and apparatus to autonomously navigate a vehicle by selecting sensors from which to obtain measurements for navigation.

BACKGROUND

In some environments, global positioning system (GPS) denial, sensor failures, and/or interference can inhibit accurate navigation of a vehicle that depends on such GPS and/or sensors for navigation. As a result, these denials and/or interference can endanger the mission success of a vehicle for performing a task.

SUMMARY

Disclosed example methods to navigate a vehicle include determining environmental data associated with an area in which the vehicle is to navigate; based on the environmental data, automatically ranking a plurality of sensors that are available to the vehicle by respective costs of using the sensors to generate a navigation solution; automatically determining a subset of the sensors from which to obtain measurements based on the ranking and based on comparisons of a) first importance values of the sensors for navigating the vehicle with b) second importance values of the sensors for performing a second task; obtaining measurements from the subset of the sensors; calculating a navigation command to navigate the vehicle; and executing a first navigation action to implement the navigation command.

Disclosed example vehicles include a propulsion system to provide thrust to the vehicle, a control system to provide directional control to the vehicle and a plurality of sensors to collect data. Disclosed example vehicles further include a sensor ranker to, receive environmental data associated with an area in which the vehicle is to navigate and, based on the environmental data, automatically rank the sensors by respective costs of using the sensors to generate a navigation solution. Disclosed example vehicles further include a sensor negotiator to automatically determine a subset of the sensors from which to obtain measurements based on the ranking and based on comparisons of a) first importance values of the sensors for navigating the vehicle with b) second importance values of the sensors for performing a second task. Disclosed example vehicles further include a navigation filter to obtain measurements from the subset of the sensors, calculate a navigation command to navigate the vehicle, and execute a first navigation action to implement the navigation command.

The features, functions, and advantages that have been discussed can be achieved independently in various examples or may be combined in yet other examples further details of which can be seen with reference to the following description and drawings.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Known autonomous flight vehicles rely on a preset group of navigation sensors that pass all available measurements into a navigation filter. Disclosed examples use additional sensors to navigate a vehicle in different environments, such as different phases of a flight, to enable a vehicle implementing the disclosed examples to operate in GPS-challenged environments.

Disclosed examples implement a navigation coordinator, which manages and/or allocates sensor resources of a vehicle between navigation tasks and other task(s). Disclosed examples automate the process of selecting navigation sensors throughout a vehicle's mission. For example, instead of passing any and all available sensor measurements directly into a navigation filter, disclosed example methods and vehicles rank which of a set of sensors are preferred for use in navigating the vehicle, obtains access to those sensors where appropriate for secondary tasks, and monitors the performance of the sensors. If a requested navigation accuracy is not achieved using a selected subset of the sensors, disclosed examples predict vehicle maneuvers (e.g., acceleration, deceleration) and/or routes (e.g., changes in direction) that will increase the accuracy of the navigation states, and request a navigation filter to perform the determined action(s). Disclosed examples adapt to sensor failures, interference, and/or emerging threats to the vehicle within a dynamic real-time environment.

Disclosed examples use the selected sensors to calculate and output a correction to a navigation state that is calculated by a navigation system, such as correcting an inertial navigation system.

Limitations on vehicle resources, such as throughput limitations (e.g., bandwidth and/or processing limitations) and/or conflicts with mission tasks (e.g., mission critical tasks of the vehicle) may inhibit the use of one or more equipped sensors by the vehicle for navigation. Disclosed examples improve the navigation performance of vehicles (e.g., aircraft) operating individually and/or groups of vehicles (e.g., multiple aircraft) that share sensor resources.

In an environment in which multiple vehicles share sensor resources, disclosed examples reduce (e.g., minimize) the number of sensors used by each vehicle to achieve mission success, and allocates the use of higher-accuracy sensors to vehicles with higher-priority tasks. In either individual or group operation, disclosed example methods and vehicles autonomously select which of the sensors are to be used, and what actions are to be taken based on changing conditions and/or emerging threats to the vehicle. Accordingly, disclosed examples enable a vehicle operator to focus on mission objectives instead of micromanaging vehicle sensor resources.

Disclosed example methods and vehicles autonomously select sensors and share resources to maintain navigation quality while ensuring mission success.

Figure 1:
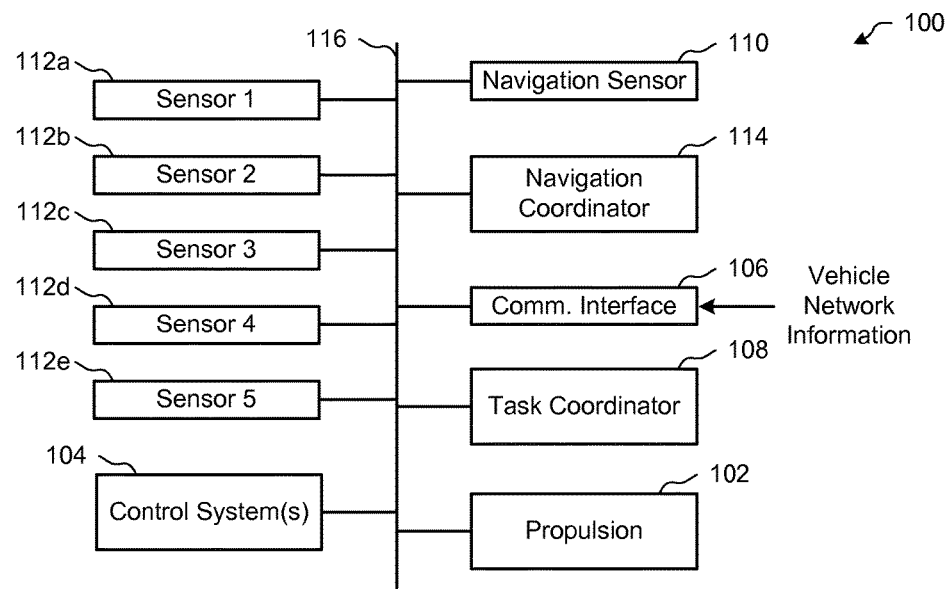
FIG. 1 is a block diagram of an example vehicle constructed in accordance with the teachings of this disclosure.

FIG. 1 is a block diagram of an example vehicle 100. The example vehicle 100 of FIG. 1 may operate autonomously (e.g., self-navigate and/or perform additional tasks) when provided with a set of objectives and/or operating parameters.

The example vehicle 100 of FIG. 1 includes a propulsion system 102, a control system 104, a communications interface 106, a task coordinator 108, a navigation sensor 110, additional sensors 112a-112e, and a navigation coordinator 114. The example vehicle 100 may have additional components and/or systems. The example propulsion system 102, the example control system 104, the example communications interface 106, the example task coordinator 108, the example navigation sensor 110, the example sensors 112a-112e, and the example navigation coordinator 114 are communicatively connected in FIG. 1 via a bus 116. However, the propulsion system 102, the example control system 104, the example communications interface 106, the example task coordinator 108, the example navigation sensor 110, the example sensors 112a-112e, and the example navigation coordinator 114 may be coupled via any type and/or combination of connections.

The propulsion system 102 provides thrust to the vehicle 100. For example, the propulsion system 102 may include any appropriate combination of engine(s) and/or thrust generators to enable the vehicle to move. The example propulsion system 102 may also include one or more interfaces through which the engines and/or thrust generator(s) can be manipulated.

The control system 104 provides directional control to the vehicle 100. For example, the control system 104 may include control surfaces (e.g., wings, ailerons, wheels, etc.) and/or one or more interfaces through which the control surfaces can be manipulated.

The communications interface 106 of FIG. 1 communicates with external entities, such as other vehicles, ground stations, and/or satellite systems, to exchange information about a current environment in which the vehicle 100 is located and/or to which the vehicle 100 is traveling, collected sensor data, and/or control data.

The task coordinator 108 of FIG. 1 coordinates one or more non-navigation tasks to be performed by the vehicle 100. The non-navigation tasks may be based on a mission to be accomplished by the vehicle 100. For example, if the vehicle 100 is an aircraft that is to capture photographs of the ground, the task coordinator 108 manages image sensor(s), image object recognition system(s), data storage devices, and/or any other sensors and/or devices needed to perform the image capture task.

As part of management of the task(s), the task coordinator 108 determines the relative importance of the sensor(s) in performing a non-navigation task based on the necessity of each sensor for performing the task at a given state of the vehicle 100. For example, at a first state of the vehicle (e.g., when a target object to be photographed is in view of an image sensor), the task coordinator 108 determines that the importance of the sensor (e.g., as expressed using an importance value) for the imaging task is high. Conversely, at a second state of the vehicle 100 (e.g., when no target objects are in view of the image sensor), the task coordinator 108 reduces the importance of the sensor for the non-navigation task (e.g., the importance value of the sensor for the non-navigation task), and the sensor may be used, for example, for navigation tasks as described below.

The navigation sensor 110 of FIG. 1 includes one or more sensor(s) having a primary purpose of providing navigation-related data. Example navigation sensors 110 include a GPS sensor and/or other satellite-based positioning system sensor, inertial sensors, and/or any other type(s) of sensors that provide navigation-related data.

The example sensors 112a-112e may include a variety of sensors that collect data. The sensors 112a-112e may include any type(s) and/or quantities of sensors, such as sensors that are intended for a particular non-navigation task (e.g., ground imaging, surveillance, target tracking, etc.).

In some examples, one or more of the sensors 112a-112e are virtual sensors representative of actual sensors present on another vehicle, where the other vehicle is accessible via the communication interface 106. For example, the communications interface 106 may receive network data indicating that data from one or more sensors on another vehicle to which the communications interface 106 is connected (e.g., via an inter-vehicle communications network, via a wide area network, etc.) can be made available as one of the sensors 112a-112e.

The example navigation coordinator 114 of FIG. 1 autonomously selects sensors and shares resources to maintain navigation quality to enhance the likelihood of mission success by the vehicle 100. The example navigation coordinator 114 receives and processes measurements from one or more of the sensors 110, 112a-112e and outputs one or more navigation signals (e.g., commands, error signals, etc.) to control and/or correct a navigation system.

In the example of FIG. 1, the navigation coordinator 114 executes on a single vehicle, and receives network information via the communication interface 106, if available. The navigation coordinator 114 uses the network information to update parameters that affect the sensor ranking process, such as weather conditions or preferred sensor usage determined by other vehicles on the network. In cases in which network information is not available, the navigation coordinator 114 may execute using pre-loaded data.

Figure 2:
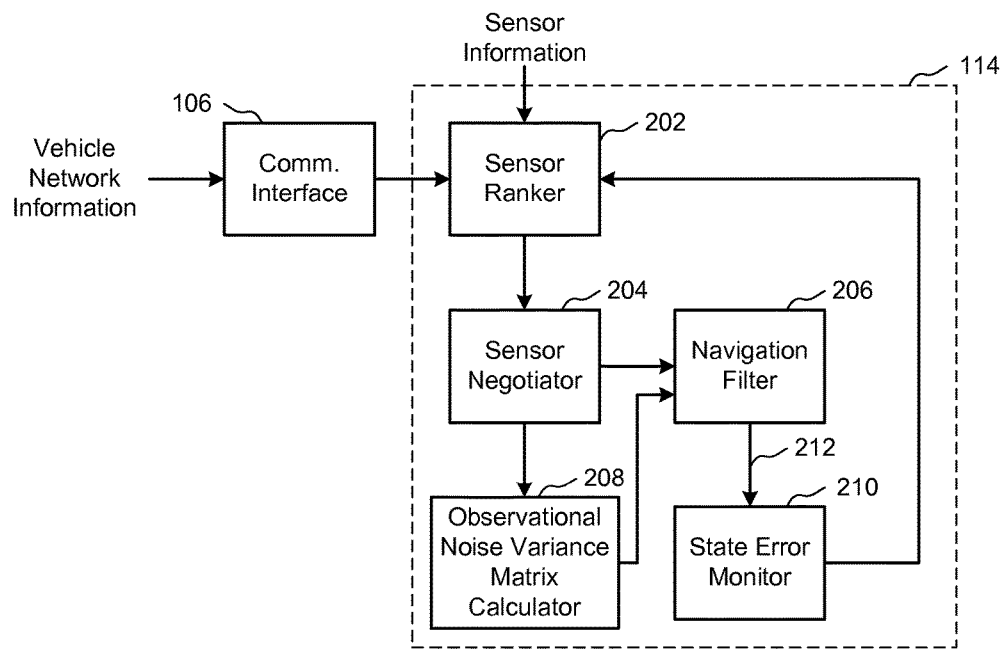
FIG. 2 is a block diagram of an example implementation of the navigation coordinator of FIG. 1.

FIG. 2 is a block diagram of an example implementation of the navigation coordinator 114 of FIG. 1. The example navigation coordinator 114 of FIG. 2 includes a sensor ranker 202, a sensor negotiator 204, a navigation filter 206, an observational noise variance matrix calculator 208, and a state error monitor 210.

The example sensor ranker 202 of FIG. 2 creates an ordered sensor request list. For example, the sensor ranker 202 predicts an uncertainty that measurements from each of the sensors 110, 112a-112e available to the vehicle 100 would induce in the navigation states. The sensor ranker 202 ranks the sensors 110, 112a-112e based on the predicted uncertainty for a given state, sensor preference, and/or other parameters added to a cost function (e.g. sensor power draw, sensor measurement bandwidth usage). In some examples, the sensor ranker 202 predicts uncertainty of a sensor measurement by propagating forward in time a Kalman Filter error covariance matrix (e.g., using predicted weather conditions and/or vehicle trajectory). The result of the sensor ranking is a sensor request list. The example sensor ranker 202 may generate a separate ranking and/or sensor request list for each state of the vehicle 100. Examples of sensor rankings (which may be used as sensor request lists) are described below with reference to FIG. 3.

The sensor ranking procedure is performed at a pre-specified rate and/or can also be triggered by the state error monitor 210 as described in more detail below.

In some examples, the example sensor ranker 202 of FIG. 2 receives environmental data associated with an area in which the vehicle 100 is to navigate. For example, the sensor ranker 202 may receive environmental information, such as weather data, via the communications interface 106 from other vehicles, from ground-based sources, from satellite-based sources, and/or from any other source.

Based on the environmental data, the example sensor ranker 202 automatically ranks the sensors 110, 112a-112e by respective costs of using the sensors 110, 112a-112e to generate a navigation solution. The costs calculated by the sensor negotiator 202 may be determined based on a cost function. The cost function may be provided to the sensor ranker 202 prior to the mission and/or during a mission via the communication interface 106.

In some examples, the sensor ranker 202 includes the navigation sensor 110 in the ranking of the sensors 110, 112a-112e, where the navigation sensor 110 has a primary task of providing navigation information. In some other examples, the navigation coordinator 114 is used when the navigation sensor 110 is in a failure state, and the sensor ranker 202 does not include the navigation sensor 110 in the ranking.

In some examples, the sensor ranker 202 includes in the cost function a prediction of the uncertainty introduced by a sensor 110, 112a-112e. For example, the sensor ranker 202 may implement extended Kalman Filter and/or discrete Kalman filter equations to predict the covariance when a particular sensor is used as a source of data to update a navigation state. Equations (1)-(3) below illustrate an example of using a discrete Kalman filter to predict the uncertainty that specific sensor measurements would induce in the navigation state.

$$P_k^- = AP_{k-1}A^T + Q \quad \text{Equation (1)}$$

$$K_k = P_k^- H^T (HP_k^- H^T + R)^{-1} \quad \text{Equation (2)}$$

$$P_k = (I - K_k H) P_k^- \quad \text{Equation (3)}$$

Equation (1) projects an error covariance ahead by predicting an error covariance $P_k^-$ of the vehicle state. Equation (2) computes a Kalman gain $K_k$. Equation (3) updates the error covariance $P_k$ based on the prediction $P_k^-$ and the calculated Kalman gain $K_k$.

In some examples, the sensor ranker 202 ranks the sensors based on the trace of the predicted Kalman filter error covariance matrix as described by Khosla, et al., "Distributed Sensor Resource Management and Planning," Signal Processing, Sensor Fusion, and Target Recognition XVI, Proc. Of SPIE Vol. 6567 (2007). The entirety of Khosla, et al., "Distributed Sensor Resource Management and Planning," is incorporated herein by reference.

The example sensor negotiator 204 selects which sensors the vehicle 100 will use for navigation for a particular state of the vehicle (e.g., during a particular time period). The sensor negotiator 204 attempts to obtain access to the highest ranked sensors based on sensor request list generated by the sensor ranker 202. If the highest ranking sensor in the sensor request list is not shared and is available, the sensor negotiator 204 automatically obtains access to measurements from the sensor. If a sensor (e.g., the sensor 112a) is a shared resource (e.g., shared between navigation tasks and other tasks), the sensor negotiator 204 bids for that sensor and obtains access if it is the highest priority task.

In some examples in which multiple vehicles are cooperating to perform a task or mission, the sensor negotiator 204 offers any of the sensors 110, 112a-112e of the vehicle 100 that are designated as shared sensors to vehicles that have a higher priority for the task or mission. For example, the sensor negotiator 204 may implement a voting scheme or other method for vehicles to use the sensors 110, 112a-112e.

A requested sensor 110, 112a-112e may be unavailable for multiple reasons. For example, if the vehicle 100 is entering an area designated for no electromagnetic emissions to minimize electromagnetic exposure, any active sensors on the vehicle 100 (e.g., electromagnetic radiation-emitting sensors) may be designated as unavailable. In another example, a sensor measurement may require the vehicle 100 to change its trajectory in order to view an object of interest, but maneuver restrictions placed on the commanded path of the vehicle 100 prevent the sensor from viewing the object. In yet another example, an optical sensor measurement may request a gimbal angle which conflicts with mission critical target tracking.

The sensor negotiator 204 attempts to gain access to the minimal number of sensors that can provide observability of all navigation error states. This is done by cycling through a request list until sensor access is granted or all sensors are denied for a given state.

If the best available sensor meets the accuracy required by mission success criteria, its measurements will be requested and it will be the sole observer for that state. If the best available sensor does not meet mission success criteria, then multiple, available sensors of lower accuracy are used to aid in observing the given state. The maximum number of sensors used will be bounded by throughput limits and sensor availability.

The sensor negotiator 204 automatically determines a subset of the sensors 110, 112a-112e from which to obtain measurements. The sensor negotiator 204 determines the subset of the sensors 110, 112a-112e based on the ranking and based on comparisons of a) first importance values of the sensors 110, 112a-112e for navigating the vehicle with b) second importance values of the sensors 110, 112a-112e for performing a non-navigation task (e.g., the task being managed by the task coordinator 108).

To determine the subset of the sensors 110, 112a-112e, the sensor negotiator 204 selects a first one of the sensors (e.g., the sensor 112a) based on a first rank of the first one of the sensors 112a. The sensor negotiator 204 compares a navigation importance value for the selected sensor 112a to a second importance value for a secondary task of the selected sensor 112a. When the navigation importance value is higher than the second importance value for the selected sensor 112a, the example sensor negotiator 204 includes the selected sensor 112a in the subset.

In some examples, the sensor negotiator 204 includes the selected sensor 112a in the subset based on determining that, prior to adding the selected sensor 112a to the subset, the subset of the sensors would not generate a navigation state to have at least a threshold accuracy.

Additionally or alternatively, the sensor negotiator 204 may not include a particular sensor 110, 112a-112e in the subset of the sensors when the sensor is unavailable and/or is needed by another task. For example, the sensor negotiator 204 may select a second one of the sensors 110, 112a-112e (e.g., the sensor 112b) based on a second rank of the sensor 112b. The sensor negotiator 204 determines whether the selected sensor 112b is available for use in generating the navigation solution and, when the sensor 112*b* is not available, omits the sensor 112*b* from the subset of the sensors.

The example navigation filter 206 obtains measurements from the subset of the sensors 110, 112*a*-112*e*. The example navigation filter 206 calculates navigation command(s) to navigate the vehicle 100, and executes navigation action(s) to implement the navigation command(s). For example, the navigation filter 206 may send commands to the propulsion system(s) 102 and/or the control system(s) 104.

The example navigation filter 206 can execute to generate navigation commands and/or solutions at a different rate than the sensor negotiation procedure. After a new set of sensors is selected by the sensor negotiator 204, the navigation filter 206 operates using a new set of measurements corresponding to the updated selection of the sensors 110, 112*a*-112*e* (along with the corresponding error matrices).

After sensors for navigation have been selected, the example observational noise variance matrix calculator 208 constructs an observation noise covariance matrix (e.g., R matrix) based on the selected sensors and the predicted conditions. The observation noise variance values describe how altitude, weather, lighting, and/or other conditions affect the variance of specific sensor measurements. In the example of FIG. 2, the example observational noise variance matrix calculator 208 calculates variance metrics corresponding to the sensors 110, 112*a*-112*e* in the subset (determined by the sensor negotiator 204).

The example state error monitor 210 of FIG. 2 triggers actions to reduce uncertainty in navigation states. The state error monitor 210 may trigger an action if state errors and/or variances exceed an error threshold. An example action that the state error monitor 210 can take to reduce uncertainty includes requesting or forcing the sensor ranker 202 to move a currently-selected sensor 110, 112*a*-112*e* to the end of the sensor request list generated by the sensor ranker 202, then re-running the negotiation procedure with the sensor negotiator 204. Another example action includes requesting that the vehicle 100 perform a maneuver to view an object of interest using a sensor, which would improve the calculated error by using a preferred sensor that offers a higher navigation accuracy. Another example action is to request that the vehicle 100 follow a different route to reduce an uncertainty ellipse of the navigation error states of the vehicle 100.

The example state error monitor 210 observes a covariance matrix 212 output by the navigation filter 206. In response to determining that the variance of a specific state exceeds a threshold variance (e.g., when the predicted accuracy is less than a threshold accuracy) for at least a threshold number of iterations (e.g., consecutive states), the example state error monitor 210 requests a navigation action. Examples of navigation actions that may be requested by the state error monitor 210 include a) executing a maneuver via the propulsion system 102 and/or the control system(s) 104, b) following a modified route via at least one of the propulsion system 102 and/or the control system(s) 104, and/or c) forcing the sensor ranker 202 to modify the ranking of the sensors 110, 112*a*-112*e*.

Figure 3:
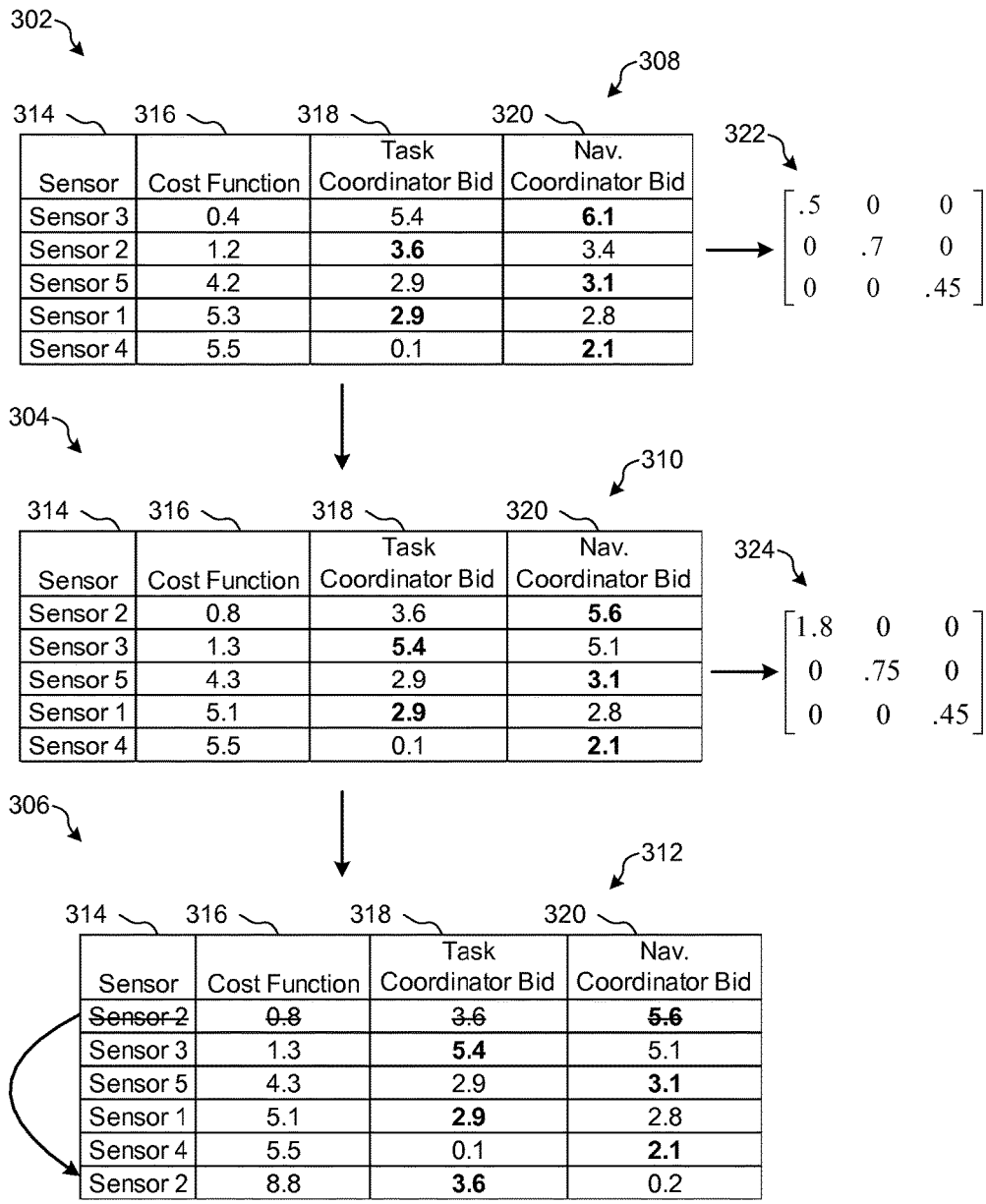
FIG. 3 illustrates examples of sensor ranking, sensor negotiation, and variance matrix calculation that may be performed by the example navigation coordinator of FIGS. 1 and/or 2.

FIG. 3 illustrates examples of sensor ranking, sensor negotiation, and variance matrix calculation that may be performed by the example navigation coordinator 114 of FIGS. 1 and/or 2. The example of FIG. 3 includes three different vehicle states 302, 304, 306. At each of the example states 302-306, the sensor ranker 202 generates a respective sensor ranking 308, 310, 312.

The first example sensor ranking 308 identifies the sensors 314 and corresponding cost function values 316. In the example sensor ranking 308 determined for the first state 302, the example sensors 112*a*-112*e* are ranked according to the cost function values 316. As shown in FIG. 3, the sensor ranking 308 ranks sensor 112*c* highest (e.g., lowest cost value), followed by the sensor 112*b*, the sensor 112*e*, the sensor 112*a*, and the sensor 112*d*.

The example sensor negotiator 204 negotiates use of the sensors 112*a*-112*e* in the sensor ranking 308 by determining task coordinator bids 318 and navigation coordinator bids 320. The task coordinator bids 318 are determined by the task coordinator 108 based on the requirements to perform task(s) controlled by the task coordinator 108. The navigation coordinator bids 320 are determined by the example sensor ranker 202 based on, for example, the current state 302 of the vehicle 100.

The sensor negotiator 204 determines the sensors for which the navigation coordinator bid 320 is higher than the task coordinator bid 318. In the example of FIG. 3, the sensor negotiator 204 selects the sensor 112*c*, the sensor 112*e*, and the sensor 112*d* because the respective navigation coordinator bids 320 are higher than the respective task coordinator bids 318.

Based on the sensor negotiator 204 selecting the sensors 112*c*, 112*e*, 112*d*, the example observational noise variance matrix calculator 208 calculates a variance matrix 322.

At a later time, the vehicle 100 enters the second state 304. The vehicle 100 receives second environmental information (e.g., a different mission phase, different weather conditions, etc.) via the communications interface 106. Based on the second environmental information, the example sensor ranker 202 determines the sensor ranking 310 by determining updated values of the cost function 316 for the sensors 314. For example, the sensor ranker 202 may update the cost function based on propagating a Kalman Filter covariance matrix forward along a predicted route and/or update observation error covariance values based on anticipating changes in weather conditions and/or signal degradation along the predicted route. The sensor negotiator 204 determines updated values of the task coordinator bids 318 and the navigation coordinator bids 320. In the example of FIG. 3, the sensor ranker 202 changes the rankings of the sensors 112*b* and 112*c* in response to changes in the environmental data.

Based on the updated values in the sensor ranking 310, the sensor negotiator 204 selects a subset of the sensors 112*a*-112*e* for use in determining a navigation solution of the vehicle 100 (e.g., correction(s) and/or error(s) for another navigation method). From the sensor ranking 310, the example sensor negotiator 204 selects the sensor 112*b*, the sensor 112*e*, and the sensor 112*d* for determining the navigation solution. In some examples, the sensor negotiator 204 selects fewer than all of the sensors for which navigation has a higher bid than other task(s), such as if the first sensor in the sensor ranking 310 satisfies an accuracy threshold of the navigation solution.

The example observational noise variance matrix calculator 208 an observational noise covariance matrix (e.g., an R matrix for a Kalman filter) using data about the sensors 110, 112*a*-112*e* that is determined prior to the mission being performed by the vehicle 100 (e.g., test data from different modes of operation of the sensors 110, 112*a*-112*e*). Using the observational noise covariance matrix, the example navigation filter 206 calculates a second variance matrix 324 from the selected sensors 112*b*, 112*d*, 112*e*, to determine an estimated error in the navigation solution resulting from using the selected sensors. In the example of FIG. 3, the state error monitor 210 determines that a total error reflected in the navigation solution exceeds an error threshold.

In response to identifying that the error exceeds the threshold, the state error monitor 210 determines that use of the sensor 112b (e.g., at the top of the sensor ranking 310 of FIG. 3) is the cause of the high error at the state 304 of the vehicle 100. The example state error monitor 210 forces a modification of the ranking of the sensors 110, 112a-112e by, for example, requesting the sensor ranker 202 to force the sensor 112b to the bottom of an updated sensor ranking 312 at the third state 306 of the vehicle. For example, the state error monitor 210 may permanently or temporarily modify the cost function used by the sensor ranker 202 to calculate the cost function values 316 in the third sensor ranking 312.

As shown in FIG. 3, the update to the cost function from the second state 304 to the third state 306 results in a change to the ranking of the sensor 112b from the highest ranking in the sensor ranking 310 to the lowest ranking in the sensor ranking 312 (e.g., due to a change in the environmental data received via the communications interface 106 and due to a re-calculation of the cost function 316).

In a first example of operation, an example aircraft implementing the vehicle 100 of FIG. 1, including the navigation coordinator 114 of FIG. 2, includes an optical image correlation sensor (e.g., a sensor that enables navigation based on recognizing features in an image and correlating them with a database of known features) and a star tracking sensor (e.g., a sensor that may be used as a source of data for determining attitude and position based on identifying stars and/or near earth objects, and the angles from the aircraft at which the identified stars and/or near earth objects are viewable).

When flying at low altitudes (e.g., altitudes below the clouds), the optical image correlation sensor can provide higher accuracy for navigation, and is highly ranked by the sensor ranker 202. Conversely, the star tracker sensor is ranked lower, due to errors induced in the star tracking sensor at lower altitudes (e.g., altitudes below the cloud ceiling). Because the optical image correlation sensor is not used for other purposes, the sensor negotiator 204 acquires use of the optical image correlation sensor for navigation, and the navigation filter 206 uses measurements from the optical image correlation sensor to generate and/or correct navigation estimates for the aircraft.

At a later time, the aircraft climbs to a higher altitudes (e.g., altitudes above the cloud ceiling) according to a planned flight path and/or to avoid a threat identified by information obtained via the communications interface 106. The sensor ranker 202 identifies the change in altitude and determines that the optical image correlation sensor introduces a higher error (e.g., achieves lower accuracy) in navigation states generated using the optical image correlation sensor. The sensor ranker 202 also determines that the star tracker sensor results in a lower error. Accordingly, the sensor ranker 202 determines that the cost function value for the star tracker sensor is higher (where lower cost is preferred over higher cost) than the cost function value for the optical image correlation sensor at the second state corresponding to the higher altitude. The example sensor negotiator 204 obtains access to the star tracker sensor, and the navigation filter uses measurements from the star tracker sensor to navigate.

At a third time, the sensor negotiator 204 determines that the importance value for another task to be performed by the aircraft has increased for the star tracker sensor (e.g., by the task coordinator 108 of FIG. 1), and now exceeds the navigation importance value of the star tracker sensor. As a result, the sensor negotiator 204 removes the star tracker sensor from the sensors used for navigation, and selects other sensors equipped on the aircraft based on the rankings and the availabilities of those sensors.

In another example of operation, an example aircraft implementing the vehicle 100 of FIG. 1, including the navigation coordinator 114 of FIG. 2, is equipped with a GPS sensor for navigation. Because the GPS sensor has a high accuracy for navigation, and the GPS sensor is not typically used for other tasks to be performed by the aircraft, the sensor ranker 202 of the example aircraft ranks the GPS sensor higher than the other sensors (i.e., at the top of the sensor rankings).

At some time during a flight of the aircraft, the GPS sensor experiences interference and begins producing measurements having high error. While the example sensor ranker 202 continues to rank the GPS sensor high based on the calculated cost function value and the example sensor negotiator 204 continues to access the GPS sensor based on the ranking, the covariance matrix output by the navigation filter 206 (or other measure of error and/or uncertainty) begins to show an increasing variance in the position and/or velocity states). When the variance for the GPS sensor increases beyond a variance threshold, the example state error monitor 210 of the aircraft requests that an action be taken to reduce the error.

In this example, the state error monitor 210 sends a request to the sensor ranker 202 to increase the cost function value of the GPS sensor to reflect the reduced accuracy of the GPS sensor (e.g., due to the interference). The example sensor ranker 202 recalculates the cost function value of the GPS sensor and, due to the increased cost of the GPS function, the sensor ranker 202 reduces the rank of the GPS sensor in the sensor rankings. The example sensor negotiator 204 attempts to negotiate for sensors based on the updated sensor ranking, which results in the sensor negotiator 204 obtaining access to sensors other than the GPS sensor. The example navigation filter 206 obtains the measurements from the sensors selected by the sensor negotiator 204 and generates navigation commands.

If the interference at the GPS sensor subsides, the cost function applied by the sensor ranker 202 may be modified to reduce the cost of the GPS sensor, at which time the ranking of the GPS sensor may increase and the GPS sensor may again be selected for use in navigation based on the updated ranking.

While an example manner of implementing the navigation coordinator 114 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 106, the example task coordinator 108, sensor ranker 202, the example sensor negotiator 204, the example navigation filter 206, the example observational noise variance matrix calculator 208, the example state error monitor 210 and/or, more generally, the example navigation coordinator 114 of FIGS. 1 and/or 2 may be implemented by hardware, software, firmware and/or any combination of hardware, software and/or firmware. Thus, for example, any of the example communications interface 106, the example task coordinator 108, sensor ranker 202, the example sensor negotiator 204, the example navigation filter 206, the example observational noise variance matrix calculator 208, the example state error monitor 210 and/or, more generally, the example navigation coordinator 114 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 106, the example task coordinator 108, sensor ranker 202, the example sensor negotiator 204, the example navigation filter 206, the example observational noise variance matrix calculator 208, and/or the example state error monitor 210 is/are hereby expressly defined to include a tangible computer readable storage device or storage disk such as a memory, a digital versatile disk (DVD), a compact disk (CD), a Blu-ray disk, etc. storing the software and/or firmware. Further still, the example navigation coordinator 114 of FIGS. 1 and 2 may include one or more elements, processes and/or devices in addition to, or instead of, those illustrated in FIGS. 1 and/or 2, and/or may include more than one of any or all of the illustrated elements, processes and devices.

Figure 4:
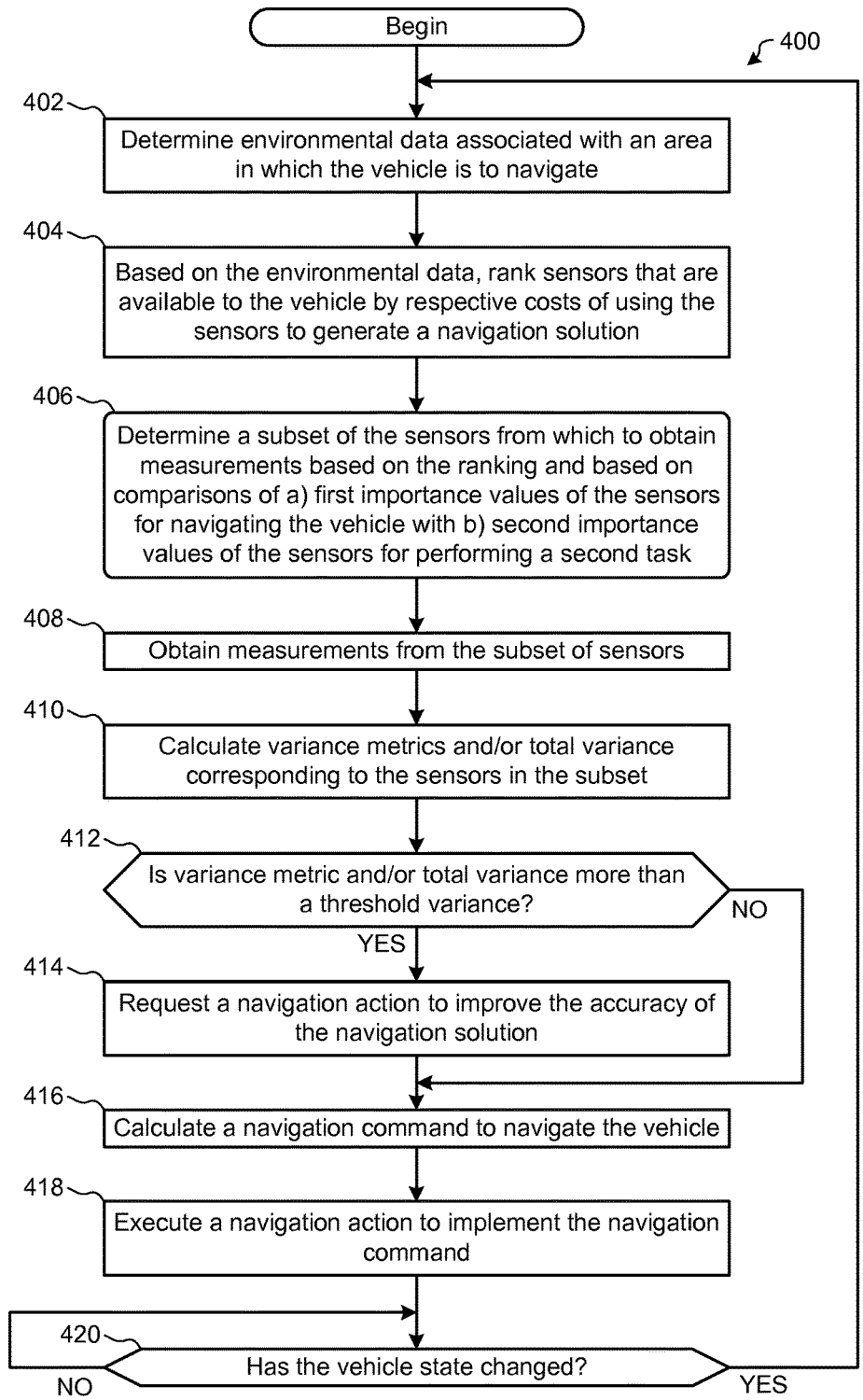
FIG. 4 is a flowchart representative of an example process to navigate a vehicle.

Flowcharts representative of example methods for implementing the vehicle 100 and/or the navigation coordinator 114 of FIGS. 1 and/or 2 are shown in FIGS. 4 and/or 5. In this example, the methods may be implemented using machine readable instructions that comprise program(s) for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than the processor 812 and/or embodied in firmware or dedicated hardware. Further, although the example program(s) are described with reference to the flowcharts illustrated in FIGS. 4 and/or 5, many other methods of implementing the example vehicle 100 and/or the navigation coordinator 114 may alternatively be used. For example, the order of execution of the blocks may be changed, and/or some of the blocks described may be changed, eliminated, or combined.

As mentioned above, the example methods of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of an example method 400 to navigate a vehicle. The example method 400 may be executed by a processor or other logic circuit of a vehicle, such as the vehicle 100 of FIG. 1 executing the navigation coordinator 114 of FIGS. 1 and/or 2.

The example sensor ranker 202 determines environmental data associated with an area in which the vehicle 100 is to navigate (block 402).

Based on the environmental data, the example sensor ranker 202 automatically ranks sensors 110, 112a-112e that are available to the vehicle 100 by respective costs of using the sensors 110, 112a-112e to generate a navigation solution (block 404). For example, the sensor ranker 202 may determine the costs of the sensors 110, 112a-112e based on one or more of a) predicted respective uncertainties in the navigation solution that would result from using the sensors 110, 112a-112e, b) relative preferences for the sensors 110, 112a-112e based on the navigation task and/or other tasks (e.g., defined prior to deployment of the vehicle 100), c) power requirements of the sensors 110, 112a-112e, and/or d) bandwidth usage for communicating measurements from the sensors 110, 112a-112e.

The example sensor negotiator 204 automatically determines a subset of the sensors 110, 112a-112e from which to obtain measurements, based on the ranking and based on comparisons of a) navigation importance values of the sensors 110, 112a-112e for navigating the vehicle 100 with b) second importance values of the sensors 110, 112a-112e for performing a second task (block 406). An example method to implement block 406 is described below with reference to FIG. 5.

The example navigation filter 206 obtains measurements from the subset of the sensors 110, 112a-112e (block 408).

The example observational noise variance matrix calculator 208 calculates variance metrics and/or a total variance corresponding to the sensors 110, 112a-112e in the subset (block 410).

The example state error monitor 210 determines whether the variance metric(s) and/or the total variance exceed a threshold variance (block 412). If the variance metric(s) and/or the total variance exceed a threshold variance (block 412), the example state error monitor 210 requests a navigation action to improve the accuracy of the navigation solution (block 414). For example, the navigation action requested by the state error monitor may include executing a maneuver using the vehicle 100 (e.g., via the propulsion system 102 and/or the control system(s) 104), following a modified route via the vehicle 100 (e.g., via the propulsion system 102 and/or the control system(s) 104), and/or forcing a modification of the ranking of the sensors 110, 112a-112e (e.g., by modifying the cost function used by the sensor ranker 202 to rank the sensors 110, 112a-112e).

After requesting a navigation action (block 414), or if neither the variance metric(s) nor the total variance exceed a threshold variance (block 412), the example navigation filter 206 calculates a navigation command to navigate the vehicle 100 (block 416).

The example navigation filter 206 executes a navigation action to implement the navigation command (block 418).

The example sensor ranker 202 determines whether a vehicle state of the vehicle 100 has changed (block 420). If the vehicle state has not changed (block 420), block 420 iterates to monitor for a change to the vehicle state. When the sensor ranker 202 determines that the vehicle state has changed (block 420), control returns to block 402 to determine additional environmental data. In this manner, the example method 400 may iterate for subsequent states for the duration of navigation of the vehicle 100.

Figure 5:
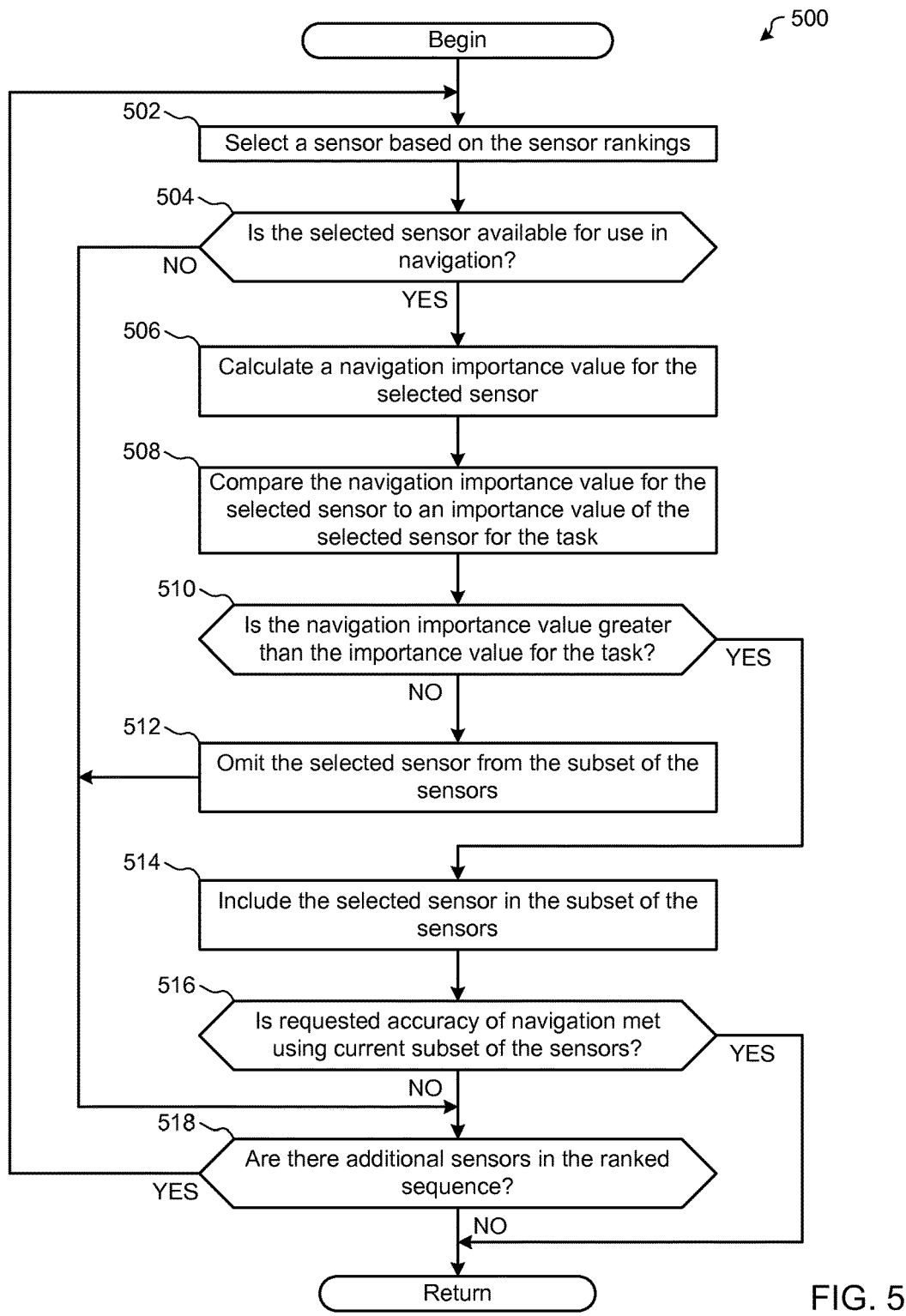
FIG. 5 is a flowchart representative of an example process to determine a subset of sensors of a vehicle for use in determining a navigation solution.

FIG. 5 is a flowchart representing an example method 500 to determine a subset of the sensors for use in determining a navigation solution. The example method 500 may be performed to implement block 406 of FIG. 4.

The example sensor negotiator 204 selects a first one of the sensors 110, 112a-112e based on a first rank of the first one of the sensors 110, 112a-112e (block 502). For example, the sensor negotiator 204 may select the sensor 112c at the top of the sensor ranking 308 of FIG. 3 based on the cost function value 316 for the sensor 112c.

The example sensor negotiator 204 determines whether the selected sensor 112c is available for measurements (block 504). For example, the selected sensor 112c may be disabled or otherwise unavailable due to environmental conditions (e.g., weather conditions) and/or operating constraints (e.g., restrictions on use of the selected sensor due to mission goals). The sensor negotiator 204 may determine that the selected sensor 112c is unavailable by identifying a restriction on using the selected sensor 112 defined by another task, identifying a vehicle maneuver that is required to use the second one of the sensors for navigation as being outside of bounds placed by another task and/or identifying interference with another task as occurring based on using the selected sensor 112c for navigation.

If the selected sensor 112c is available for measurements (block 504), the sensor negotiator 204 calculates a navigation importance value 320 for the selected sensor 112c (block 506). For example, the sensor negotiator 204 determines an importance of navigation and the value of the selected sensor 112c to navigation.

The sensor negotiator 204 compares a navigation importance value 320 for the selected sensor 112c to a second importance value (e.g., the task coordinator bid 318) for the selected sensor 112c (block 508). For example, the task coordinator bid 318 for the selected sensor 112c may be obtained from the task coordinator 108 of FIG. 1, which is compared to the navigation importance value 320 for the selected sensor 112c to determine which of the values is higher (e.g., which of the navigation task or the secondary task is more important in the current vehicle state).

If the navigation importance value does not exceed the second importance value (block 510), the sensor negotiator 204 omits the selected sensor 112c from the subset of the sensors (block 512).

Conversely, if the navigation importance value exceeds the second importance value (block 510), the sensor negotiator 204 includes the selected sensor 112c in the subset of the sensors for use in navigation (block 514). The sensor negotiator 204 determines whether a requested navigation accuracy is met using the current subset of the sensors (block 516).

If the requested navigation accuracy is not met using the current subset of the sensors (block 516), after omitting the selected sensor 112c from the subset of the sensors (block 512), or when the selected sensor 112c is not available for measurements (block 504), the example sensor negotiator 204 determines whether there are additional sensors 110, 112a-112e in the sensor ranking 308 (block 518). In the example of FIG. 3, the sensor negotiator 204 may determine that the next sensor in the sensor ranking 308 is the sensor 112b. When there are additional sensors 110, 112a-112e in the sensor ranking 308 (block 518), control returns to block 502 to select the next sensor 112b in the sensor ranking 308.

If there are no additional sensors 110, 112a-112e in the sensor ranking 308 (block 518), or if the requested navigation accuracy is not met using the current subset of the sensors (block 516), the example method 500 ends and control returns to a calling process such as block 406 of FIG. 4.

Figure 6:
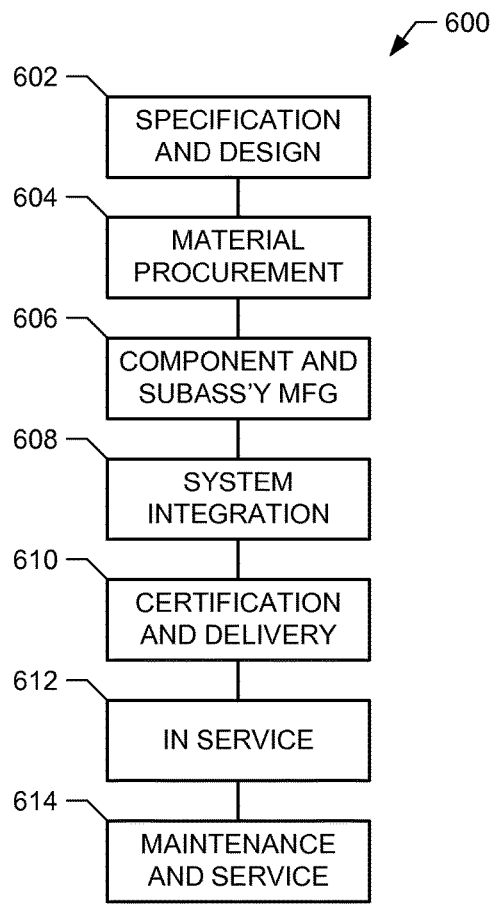
FIG. 6 is a flowchart of platform production and service methodology.
Figure 7:
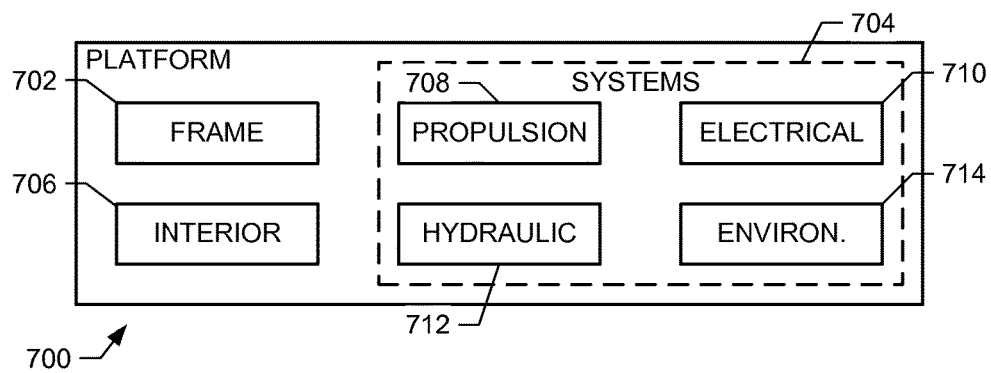
FIG. 7 is a block diagram of a platform.

Examples of the disclosure may be described in the context of a platform manufacturing and service method 600 as shown in FIG. 6 and a platform 700, such as an aircraft, as shown in FIG. 7. During pre-production, the example method 600 may include specification and design (block 602) of the platform 700 (e.g., a lift vehicle). The example control process 300 and/or the example process 700 may be developed during the specification and design portion of preproduction of block 602. Preproduction may further include material procurement (block 604). During production, component and subassembly manufacturing (block 606) and system integration (block 608) of the platform 700 (e.g., a lift vehicle) takes place. The example vehicles 100 of FIG. 1 may be constructed during production, component and subassembly manufacturing of block 606, and/or programmed with the processes 400 of FIG. 4 and/or the process 500 of FIG. 5 during production, component and subassembly manufacturing of block 606 and/or system integration of block 608. In particular, the example communications interface 106, the example task coordinator 108, sensor ranker 202, the example sensor negotiator 204, the example navigation filter 206, the example observational noise variance matrix calculator 208, the example state error monitor 210 and/or, more generally, the example navigation coordinator 114, and/or the processes 400, 500 may be configured or programmed with the specific equations and/or aerodynamic coefficients specific to the particular vehicle being constructed. Thereafter, the platform 700 (e.g., a lift vehicle) may go through certification and delivery (block 610) in order to be placed in service (block 612). While in service by a customer, the platform 700 (e.g., a lift vehicle) is scheduled for routine maintenance and service (block 614), which may also include modification, reconfiguration, refurbishment, etc., of the example communications interface 106, the example task coordinator 108, sensor ranker 202, the example sensor negotiator 204, the example navigation filter 206, the example observational noise variance matrix calculator 208, the example state error monitor 210 and/or, more generally, the example navigation coordinator 114, and/or the processes 400, 500 during the maintenance and service procedures of block 614.

Each of the operations of the example method 600 may be performed or carried out by a system integrator, a third party, and/or an operator (e.g., a customer). For the purposes of this description, a system integrator may include without limitation any number of platform (e.g., a lift vehicle) manufacturers and major-system subcontractors; a third party may include without limitation any number of venders, subcontractors, and suppliers; and an operator may be an airline, leasing company, military entity, service organization, and so on.

As shown in FIG. 7, the platform 700 (e.g., a lift vehicle) produced by example method 600 may include a frame 702 with a plurality of systems 704 and an interior 706.

Examples of high-level systems 704 include one or more of a propulsion system 708, an electrical system 710, a hydraulic system 712, and an environmental system 714. The example systems and methods disclosed herein may be integrated into the example systems 704, 708, 710, 712, 714. Any number of other systems may be included.

Apparatus and methods embodied herein may be employed during any one or more of the stages of the production and service method 600. For example, components or subassemblies corresponding to production process 606 may be fabricated or manufactured in a manner similar to components or subassemblies produced while the platform 700 (e.g., a lift vehicle) is in service 612. Also, one or more apparatus embodiments, method embodiments, or a combination thereof may be implemented during the production stages 606 and 608, for example, by substantially expediting assembly of or reducing the cost of a platform 700 (e.g., a lift vehicle). Similarly, one or more of apparatus embodiments, method embodiments, or a combination thereof may be utilized while the platform 700 (e.g., a lift vehicle) is in service 612, for example and without limitation, to maintenance and service 614.

Figure 8:
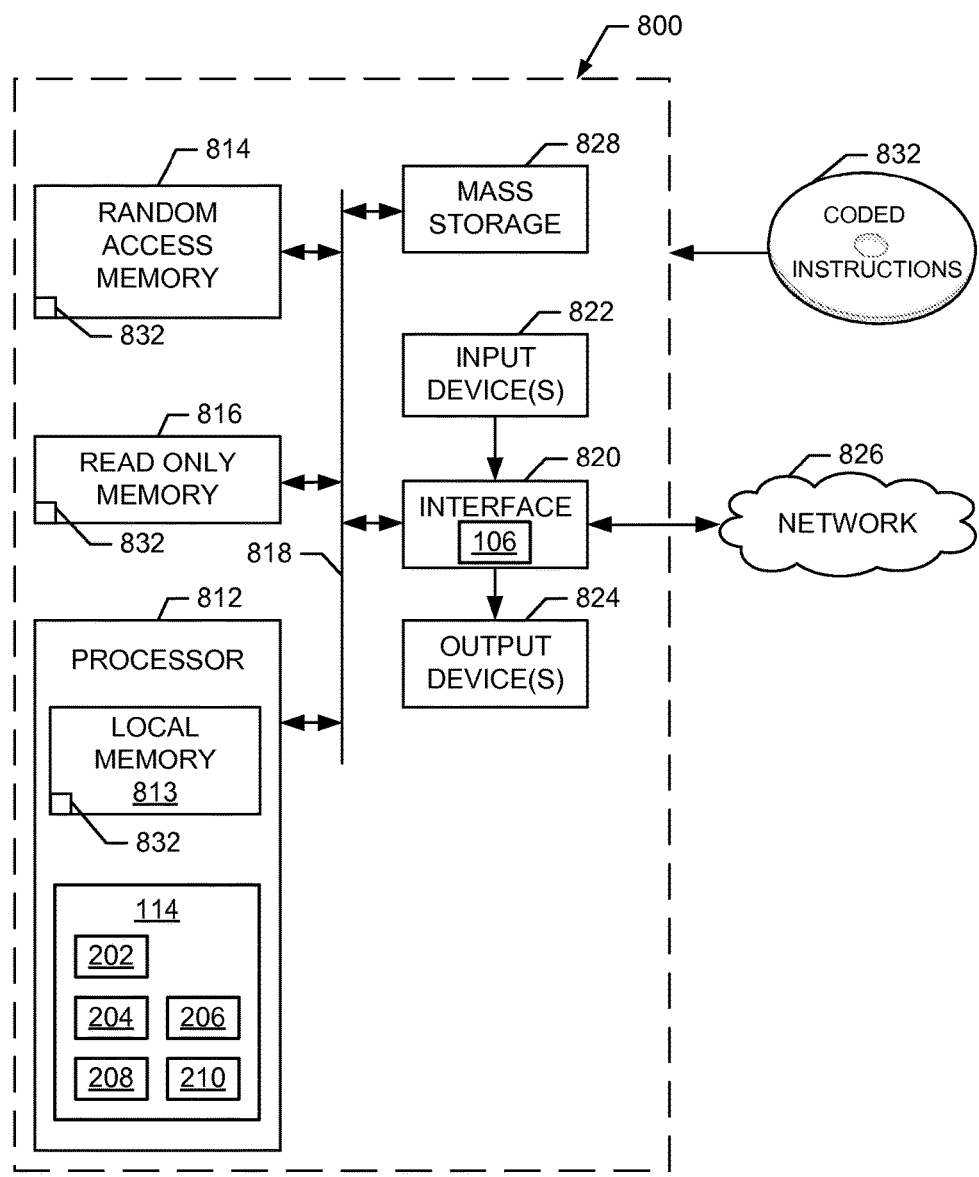
FIG. 8 is a block diagram of an example processor platform that may be used to implement the methods and apparatus described herein.

FIG. 8 is a block diagram of an example processor platform 800 to implement the processes 400, 500 of FIGS. 4 and/or 5, and/or to implement the vehicle 100 and/or the navigation coordinator 114 of FIGS. 1 and/or 2. The processor platform 800 can be, for example, an onboard and/or integrated flight computer, a server, a personal computer, a laptop or notebook computer, or any other type of computing device or combination of computing devices.

The processor platform 800 of the instant example includes a processor 812. For example, the processor 812 can be implemented by one or more microprocessors or controllers from any desired family or manufacturer. The example processor 812 may implement the example sensor negotiator 204, the example navigation filter 206, the example observational noise variance matrix calculator 208, the example state error monitor 210 and/or, more generally, the example navigation coordinator 114 of FIGS. 1 and/or 2.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface. The example interface circuit 820 may implement the communications interface 106 of FIG. 1.

One or more input devices 822 are connected to the interface circuit 820. The input device(s) 822 permit a user to enter data and commands into the processor 812. The input device(s) 822 can be implemented by, for example, a keyboard, a mouse, a touchscreen, a voice recognition system, and/or any other method of input or input device.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a wireless local area network (WLAN) connection, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives.

Coded instructions 832 to implement the methods 400, 500 of FIGS. 4 and/or 5 may be stored in the mass storage device 828, in the volatile memory 814, in the non-volatile memory 816, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to navigate a vehicle, comprising:
   determining environmental data associated with an area in which the vehicle is to navigate;
   based on the environmental data, automatically ranking a plurality of sensors that are available to the vehicle by respective costs of using the sensors to generate a navigation solution;
   automatically determining a subset of the sensors from which to obtain measurements based on the ranking and based on comparisons of a) first importance values of the sensors for navigating the vehicle with b) second importance values of the sensors for performing a non-navigation task;
   obtaining measurements from the subset of the sensors;
   calculating a navigation command to navigate the vehicle; and
   executing a first navigation action to implement the navigation command.

2. The method defined in claim 1, further including:
   calculating observation noise metrics corresponding to the sensors in the subset based on the environmental data;
   predicting a covariance of a navigation state of the vehicle based on the observation noise metrics; and
   in response to determining that the predicted covariance exceeds a threshold variance, requesting a second navigation action.

3. The method defined in claim 2, wherein the second navigation action is at least one of:
   executing a maneuver using the vehicle;
   following a modified route via the vehicle; or
   forcing a modification of the ranking of the sensors.

4. The method defined in claim 1, wherein the determining of the subset of the sensors includes:
   selecting a first one of the sensors based on a first rank of the first one of the sensors;
   comparing a first one of the first importance values for the first one of the sensors to a first one of the second importance values for the first one of the sensors; and
   when the first one of the first importance values exceeds the first one of the second importance values, including the first one of the sensors in the subset.

5. The method defined in claim 4, wherein the including of the first one of the sensors in the subset is based further on determining that, prior to adding the first one of the sensors to the subset, the subset of the sensors would not generate a navigation state to have at least a threshold accuracy.

6. The method defined in claim 4, wherein the determining of the subset of the sensors further includes:
selecting a second one of the sensors based on a second rank of the second one of the sensors;
determining whether the second one of the sensors is available for use in generating the navigation solution; and
when the second one of the sensors is not available, omitting the second ones of the sensors from the subset of the sensors.

7. The method defined in claim 6, wherein the determining of whether the second one of the sensors is available includes at least one of: a) identifying a restriction on using the second one of the sensors, the restriction being defined by the non-navigation task or a second task; b) identifying a vehicle maneuver that is required to use the second one of the sensors for navigation as being outside of bounds placed by the second task or the third task; or c) identifying interference with the non-navigation task or the second task as occurring based on using the second one of the sensors for navigation.

8. The method defined in claim 1, further including determining the costs based on at least one of: a) predicted respective uncertainties in the navigation solution that would result from using the sensors; b) relative preferences for the sensors based on the navigating of the vehicle and the non-navigation task; c) power requirements of the sensors; or d) bandwidth usage for communicating measurements from the sensors.

9. The method defined in claim 1, further including:
detecting a change in at least one of the environmental data or a navigation state of the vehicle;
automatically updating the ranking of the plurality of sensors based on updated environmental data and an updated navigation state of the vehicle;
automatically updating the first importance values of the sensors and the second importance values of the sensors;
automatically updating the subset of the sensors from which to obtain measurements based on the updated ranking, the updated first importance values, and the updated second importance values;
obtaining second measurements from the updated subset of the sensors;
calculating a second navigation command to navigate the vehicle; and
executing a second navigation action to implement the second navigation command.

10. The method of claim 1, further including predicting uncertainties introduced by the respective sensors into the navigation solution based on a covariance when the respective sensors are used as a source of data to update a navigation state, and wherein the costs of using the respective sensors are based on the uncertainties introduced by the respective sensors.

11. A vehicle, comprising:
a propulsion system to provide thrust to the vehicle;
a control system to provide directional control to the vehicle;
a plurality of sensors to collect data;
a sensor ranker to:
receive environmental data associated with an area in which the vehicle is to navigate;
based on the environmental data, automatically rank the sensors by respective costs of using the sensors to generate a navigation solution;
a sensor negotiator to automatically determine a subset of the sensors from which to obtain measurements based on the ranking and based on comparisons of a) first importance values of the sensors for navigating the vehicle with b) second importance values of the sensors for performing a non-navigation task; and
a navigation filter to:
obtain measurements from the subset of the sensors;
calculate a navigation command to navigate the vehicle; and
execute a first navigation action to implement the navigation command.

12. The vehicle as defined in claim 11, further including:
a variance matrix calculator to calculate observation noise metrics corresponding to the sensors in the subset based on the environmental data, the navigation filter to predict a covariance of a navigation state of the vehicle based on the observation noise metrics; and
a state error monitor to, in response to determining that the predicted covariance exceeds a threshold variance, request a second navigation action.

13. The vehicle as defined in claim 12, wherein the second navigation action is at least one of:
executing a maneuver via at least one of the control system or the propulsion system;
following a modified route via at least one of the control system or the propulsion; or
forcing the sensor ranker to modify the ranking of the sensors.

14. The vehicle as defined in claim 11, wherein the sensor negotiator is to determine of the subset of the sensors by:
selecting a first one of the sensors based on a first rank of the first one of the sensors;
comparing a first one of the first importance values for the first one of the sensors to a first one of the second importance values for the first one of the sensors; and
when the first one of the first importance values exceeds the first one of the second importance values, including the first one of the sensors in the subset.

15. The vehicle as defined in claim 14, wherein the sensor negotiator is to include the first one of the sensors in the subset based on determining that, prior to adding the first one of the sensors to the subset, the subset of the sensors would not generate a navigation state to have at least a threshold accuracy.

16. The vehicle as defined in claim 14, wherein the sensor negotiator is to determine of the subset of the sensors by:
selecting a second one of the sensors based on a second rank of the second one of the sensors;
determining whether the second one of the sensors is available for use in generating the navigation solution; and
when the second one of the sensors is not available, omitting the second one of the sensors from the subset of the sensors.

17. The vehicle as defined in claim 11, wherein the sensors include a navigation sensor having a primary task of providing navigation information, the sensor ranker to include the navigation sensor in the ranking of the sensors.

18. A tangible machine readable storage medium comprising machine executable instructions which, when executed, cause a processing circuit of a vehicle to at least:

determine environmental data associated with an area in which the vehicle is to navigate;

based on the environmental data, automatically rank a plurality of sensors that are available to the vehicle by respective costs of using the sensors to generate a navigation solution;

automatically determine a subset of the sensors from which to obtain measurements based on the ranking and based on comparisons of a) first importance values of the sensors for navigating the vehicle with b) second importance values of the sensors for performing a non-navigation task;

access measurements from the subset of the sensors;

calculate a navigation command to navigate the vehicle; and execute a first navigation action to implement the navigation command.

19. The tangible machine readable storage medium of claim 18, wherein the instructions are further to cause the processing circuit to:

calculate observation noise metrics corresponding to the sensors in the subset based on the environmental data;

predict a covariance of a navigation state of the vehicle based on the observation noise metrics; and in response to determining that the predicted covariance exceeds a threshold variance, request a second navigation action.

20. The tangible machine readable storage medium of claim 18, wherein the instructions are to cause the processing circuit to determine of the subset of the sensors by:

selecting a first one of the sensors based on a first rank of the first one of the sensors;

comparing a first one of the first importance values for the first one of the sensors to a first one of the second importance values for the first one of the sensors; and when the first one of the first importance values exceeds the first one of the second importance values, including the first one of the sensors in the subset.

21. The tangible machine readable storage medium of claim 20, wherein the instructions are to cause the processing circuit to include the first one of the sensors in the subset based further on determining that, prior to adding the first one of the sensors to the subset, the subset of the sensors would not generate a navigation state to have at least a threshold accuracy.

22. The tangible machine readable storage medium of claim 20, wherein the instructions are to cause the processing circuit to determine the subset of the sensors by:

selecting a second one of the sensors based on a second rank of the second one of the sensors;

determining whether the second one of the sensors is available for use in generating the navigation solution; and when the second one of the sensors is not available, omitting the second sensor from the subset of the sensors.

23. The tangible machine readable storage medium of claim 18, wherein the instructions are further to cause the processing circuit to:

detect a change in at least one of the environmental data or a navigation state of the vehicle;

automatically update the ranking of the plurality of sensors based on updated environmental data and an updated navigation state of the vehicle;

automatically update the first importance values of the sensors and the second importance values of the sensors;

automatically update the subset of the sensors from which to obtain measurements based on the updated ranking, the updated first importance values, and the updated second importance values;

access second measurements from the updated subset of the sensors;

calculate a second navigation command to navigate the vehicle; and execute a second navigation action to implement the second navigation command.

\* \* \* \* \*